United States Patent [19]
Chick

[11] 3,857,090
[45] Dec. 24, 1974

[54] GENERATION OF BEAMS OF CHARGED PARTICLES

[75] Inventor: Douglas Richard Chick, Seale, Nr. Farnham, England

[73] Assignee: National Research Development Corporation, London, England

[22] Filed: June 4, 1973

[21] Appl. No.: 366,522

[30] Foreign Application Priority Data
June 7, 1972   Great Britain.................... 26558/72

[52] U.S. Cl................................ 324/47, 250/492
[51] Int. Cl............................................ G01r 33/02
[58] Field of Search .......... 250/298, 299, 300, 398; 324/45, 47; 219/121 EB

[56] References Cited
UNITED STATES PATENTS
| | | | |
|---|---|---|---|
| 1,954,975 | 4/1934 | Zuschlag............................. | 324/47 |
| 3,218,547 | 11/1965 | Ling...................................... | 324/47 |
| 3,233,171 | 2/1966 | Yamaguchi et al.................. | 324/47 |
| 3,453,399 | 7/1969 | Reijnders............................. | 324/47 |

Primary Examiner—James W. Lawrence
Assistant Examiner—B. C. Anderson
Attorney, Agent, or Firm—Cushman, Darby & Cushman

[57] ABSTRACT

Apparatus for and methods of monitoring the current comprised by a beam of charged particles, for example a focussed ion beam as used for ion implantation of surfaces such as semiconductor circuit substrates, is described. The beam is amplitude modulated and the resultant corresponding modulation of the magnetic field strength of the beam is detected, for example by a toroidal coil, to produce an output signal proportional to the field strength modulation and therefore proportional to the beam current. A plurality, for example four, of said output signals may be derived from positions spaced around the beam to enable any deviation of the beam from the desired path to be determined, and any deviation signal obtained may be used to return the beam to the desired path.

20 Claims, 3 Drawing Figures

3,857,090

GENERATION OF BEAMS OF CHARGED PARTICLES

FIELD OF THE INVENTION

This invention relates to the generation of beams of charged particles and particularly, but not exclusively, to the generation of focussed ion beams for use, for example, in the impregnation of surfaces.

The technique of impregnating surfaces with foreign atoms, under the name of ion implantation, is in use as a supplement to the diffusion process for doping of a substrate in the manufacture of semiconductive electronic components, e.g. active elements in microcircuits. The technique is particularly applicable to semiconductive materials due to the marked changes in electrical properties which can be brought about the the addition of a small proportion of foreign atoms in this fashion. However, the technique has application to any situation where the surface of a layer is important and, although heavier dose rates might be required, the technique can also be used in other applications in the field of metallurgy, mechanical engineering, and catalytic chemistry.

It will be appreciated that in many applications where a surface is impregnated by a beam of charged particles, the total amount of charge implanted is an important parameter and it is therefore desirable that means be provided to monitor the beam current so that the total charge implanted can be determined. The profile of the beam and the adverse effects of sputtering and secondary emission make measurement of the beam current, i.e., the charged particle dose rate, very difficult. It is known to either intercept at least part of the beam, or to rely on geometric relations between the beam and a secondary, unwanted beam of differing particle charge/mass ratio, but neither of these methods has been found to be particularly satisfactory in determining the magnitude of the beam and thus the number of particles implanted into the target.

SUMMARY OF THE INVENTION

According to one aspect of the present invention, apparatus for monitoring the current comprised by a beam of charged particles comprises means for modulating the amplitude of the beam to thereby correspondingly modulate the strength of the magnetic field of the beam, and detector means responsive to the magnetic field of the beam to provide an output signal corresponding to the modulation of the strength of the magnetic field of the beam and therefore proportional to the beam current.

According to a second aspect of the present invention, a method of monitoring the current comprised by a beam of charged particles comprises modulating the amplitude of the beam to thereby correspondingly modulate the strength of the magnetic field of the beam, and detecting the modulation of the strength of the magnetic field to provide an output signal corresponding to the modulation of the magnetic field and therefore proportional to the beam current.

The magnitude of the beam current can therefore be continuously monitored by observing the magnitude of the output signal supplied by the detector means and the total amount of charge carried by the beam during a given time interval can be determined by multiplying the magnitude by the time interval. To simplify determination of the total amount of charge carried by the beam during a given time interval, the output signal from the detector means can be passed to an integrator arranged to integrate the output signal with time.

In one particular method of performing the invention, the beam is sinusoidally modulated to a depth of nearly or substantially 100 percent at a frequency in the HF range, for example 10 MHz.

The detector means may be any suitable means which can detect a time-varying magnetic field, for example a Hall-effect device or a coil. In preferred forms of the invention described in more detail hereinbelow, the detector means comprises a toroidal coil or toroidal coil system surrounding the beam and producing an output voltage signal of magnitude in the order of millivolts.

The detector means may be arranged to provide at least three said output signals each corresponding to the modulation of the strength of the magnetic field of the beam at a respective one of a plurality of positions equally spaced around a desired path of the beam, means being provided for comparing said output signals and developing therefrom a pair of position signals each indicating the position of the beam along a respective one of a pair of orthogonal axes perpendicular to and passing through the desired path of movement of the beam. In this way, it is possible to determine the position of the beam as well as the magnitude of the beam current.

Preferably, when the detector means is arranged in this fashion, it provides four said output signals and said means for comparing comprises first and second subtraction circuits each arranged to subtract the output signals from a respective pair of the output signals proportional to the modulation of the magnetic field at opposed positions, each subtraction circuit providing one of said position signals. In this case, the detector means may comprise a plurality of separate coils, one for providing each said output signal, the coils co-operating to form a multi-section toroid coaxial with the desired path of the beam. Alternatively, the detector means may comprise a plurality of separate toroidal coils, one for providing each said output signal, spaced apart along and each coaxial with the desired path of the beam.

When the position of the beam is determined as set forth above, means are desirably provided for correcting the path of movement of the beam in accordance with any deviation of the beam from the desired path as indicated by the position signals.

BRIEF DESCRIPTION OF THE DRAWING

The nature of the invention may be more readily understood from the following description of three particular ways of carrying it into effect, having reference to the accompanying drawings, in which.

DESCRIPTION OF THE PREFERRED EMBODIMENTS

Figure 1:
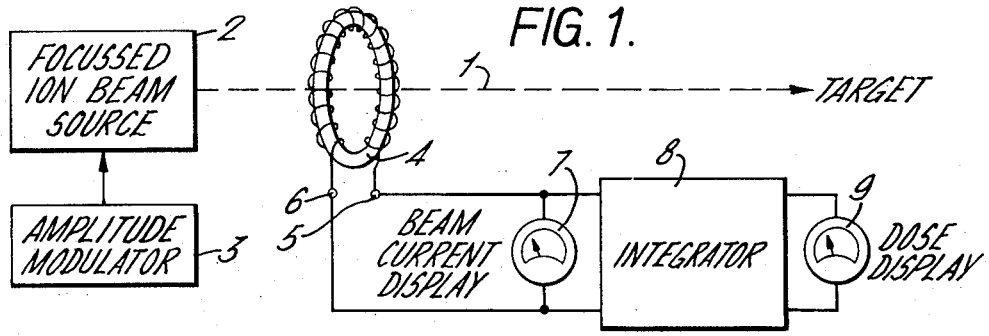
FIG. 1 is a largely schematic view of an arrangement in which a single toroidal coil is used to detect modulation of the magnetic field strength of an amplitude modulated ion beam.

Referring first to FIG. 1, a focussed ion beam 1 produced by a source 2 is directed towards a target (not shown). The source may be of any suitable form as known to those skilled in the art. For example, the source may be of the RF discharge type and may incorporate an ion accelerator to increase the energy of the beam. Reference is hereby made to an article by D. R. Chick and D. P. R. Petrie entitled "An Electrostatic Particle Accelerator" published in Proceedings IEE, Vol. 103, Part B, pages 132-145. This paper describes an ion accelerator and refers to literature describing RF discharge type ion sources.

An amplitude modulator shown schematically at 3 is provided for sinusoidally amplitude modulating the beam 1 to a depth of substantially 100 percent. In practice, the amplitude modulator 3 may form part of the source 2 and desirably modulates the beam 1 just before it emerges from the source.

The focussed ion beam 1 is directed coaxially through a toroidal coil 4, comprising a single winding on a ferromagnetic or ferrite core, on its way to the target.

Modulation of the amplitude of the ion beam 1 produces a corresponding modulation of the strength of the magnetic field around the beam. The time-varying magnetic field strength induces a current in the coil 4 which results in a corresponding electrical output signal being developed across the output terminals 5, 6 of the coil 4.

In more detail, supposing the modulation of the beam 1 causes the instantaneous beam current to take the form $i = I(1 - \cos\omega t)$, whereby I = the mean beam current, $\omega$ = the angular modulation frequency and $t$ = time. It can be shown that for a coil 4 on $n$ turns and $m$ layers wound on a core of premeability $\mu_r$, the emf $e$ developed across the coil terminals 5, 6 will be given by the equation:

$e = n\, m\, A/r \cdot \mu_r \cdot 2.10^{-7}\, I\omega \sin\omega t$ and that the rms value of the voltage will be given by $e_{rms} = n\, m\, A/r\, \mu_r \cdot \sqrt{2}.10^{-7}\, I\omega$.

With presently available ferrites or ferromagnetic spinels, a value of approximately 1,000 can be obtained for $\mu_r$ at a frequency of 10 MHz. Substituting numerical values in the equation for $e_{rms}$, it can be seen that for a coil having a single layer and 20 to 50 turns, a value of $e_{rms}$ can be obtained of approximately 2 to 4 mV, which is more than sufficient for detection purposes. Moreover, a winding comprising a single layer and only 20 to 50 turns does not have a high stray capacity.

It will be seen from the above equation for $e_{rms}$ that for a given arrangement, $e_{rms}$ is directly proportional to the mean ion current I. Accordingly, once a calibration factor for the relationship between $e_{rms}$ and I has been determined for a particular arrangement, the total ion dose sent from the source to the target over a given time can be accurately determined.

The total ion dose can be determined simply by noting the reading on beam current display means 7 connected across the output terminals 5, 6 of the coil 4 and multiplying the reading by the time during which it is present. For convenience of illustration, the beam current display means 7 is shown as a simple voltmeter. Naturally, some other type of instrument, such as a digital voltmeter, could be employed instead. Alternatively or additionally, to simplify determination of the dose, particularly if the beam current varies, the output terminals 5, 6 of the coil 4 can be connected to an integrator 8 which will carry out the required integration automatically. The total dose can be displayed on any suitable display means 9 connected to the output of the integrator 8.

Figure 2:
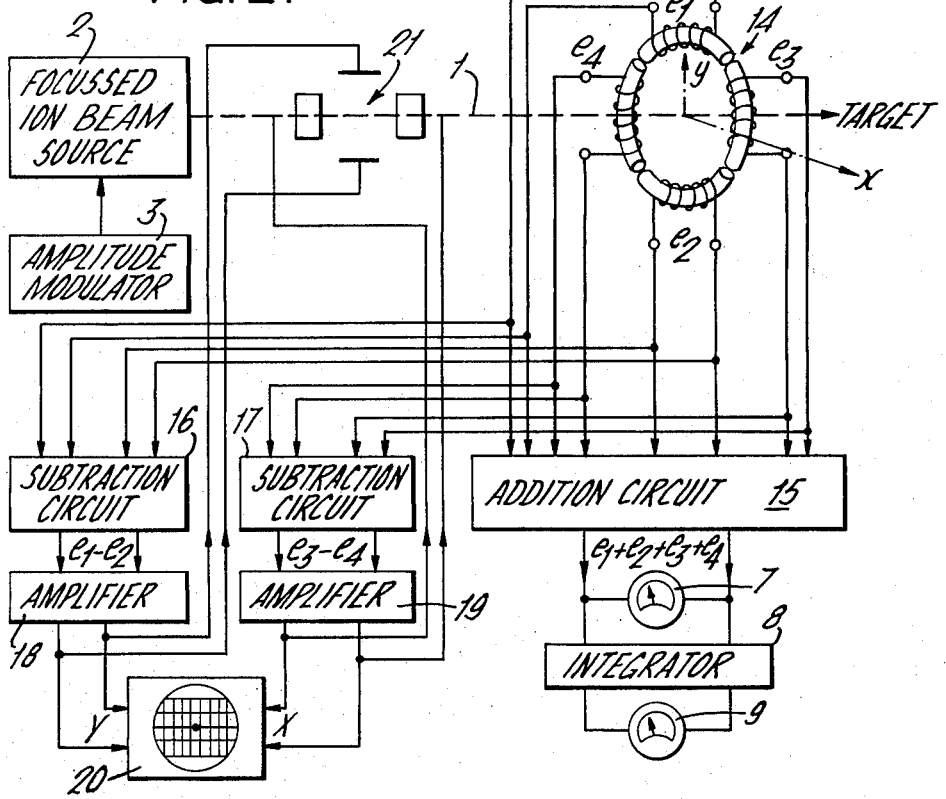
FIG. 2 is a largely schematic view of an arrangement in which modulation of the strength of the magnetic field of an amplitude modulated ion beam is detected by a toroidal coil split into four separate sections so that the position as well as the magnitude of the beam can be determined, the figure also showing optional means for correcting any deviation of the beam from the desired path of movement.

The apparatus shown schematically in FIG. 2 of the drawing has several components which are the same as in the apparatus of FIG. 1. Such components are identified by the same reference numerals as used in FIG. 1 and will not be described further.

In the apparatus of FIG. 2, instead of a single toroidal coil 4 there is provided a multi-section toroidal coil 14 split up into four like quadrant sections as shown. The gaps between the four sections cause $\mu_r$ and $e_{rms}$ to be reduced by a factor of approximately 20.

The output terminals of each of the four quadrant sections, across which respective voltages $e_1$, $e_2$, $e_3$ and $e_4$ corresponding to the beam magnetic field strength modulation are induced, are connected to an addition circuit 15 and to two subtraction circuits 16 and 17. In more detail, all four of the voltages $e_1$, $e_2$, $e_3$, and $e_4$ are connected to the addition circuit 15; voltages $e_1$ and $e_2$, developed by an opposed pair of the coil sections, are applied to the subtraction circuit 16; and voltages $e_3$ and $e_4$, developed by the other opposed pair of coil sections, are connected to the subtraction circuit 17. The addition circuit 15 adds the four voltages supplied to it to produce an output voltage equal to $e_1 + e_2 + e_3 + e_4$, and the subtraction circuits 16 and 17 each subtract the two voltages applied to them to produce, respectively, difference signals $(e_1 - e_2)$ and $(e_3 - e_4)$.

The value of each of the voltages $e_1$ to $e_4$ is given by the above-quoted equation for $e$ in the description of the apparatus of FIG. 1, when the beam I is travelling along a desired path of movement which is coaxial with the coil 14. Thus, as the four sections are identical in form, if the beam is correctly aligned with the desired path the two difference signals $(e_1 - e_2)$ and $(e_3 - e_4)$ will be zero. It can be seen from the equation for $e$ that, if the beam departs from the desired path, the magnitudes of the signals $e_1$ to $e_4$ will vary. For example, if the beam moves in the positive direction of the axis designated $v$ in FIG. 2, $e_1$ will increase and $e_2$ will decrease. In like manner, if the beam moves in the positive direction of the orthogonal axis $x$, $e_3$ will increase and $e_4$ will decrease. Thus, any non-zero magnitude of either of the difference signals $(e_1 - e_2)$ and $(e_3 - e_4)$ indicates deviation of the beam along the axes $v$ and $x$, respectively, the polarity of the difference signals indicating the direction of the deviation. It can be shown by differentiation and simple algebraic manipulation of the above-quoted equation for E that the two difference signals $(e_1 - e_2)$ and $(e_3 - e_4)$ are directly proportional to the deviation of the beam from the desired path along their respective, associated axes.

In order to keep the deviation of the beam as small as possible, desirably somewhat less than the diameter of the beam, the equipment responsive to the different signals must be very sensitive as the difference signals will be something of the order of one hundred times smaller than the signals from which they are derived. For example, if $e_1$ and $e_2$ are each approximately one millivolt, $(e_1 - e_2)$ should not exceed 10 microvolts.

To provide the required sensitivity, the difference signals $(e_1 - e_2)$ and $(e_3 - e_4)$ are applied to respective amplifiers 18, 19, which may be the display amplifiers associated with the Y and X inputs, respectively, of an oscilloscope 20. Accordingly, by viewing the oscilloscope, any deviation of the beam from the desired path can be seen by a corresponding departure of the oscilloscope trace from the central position.

The output from the addition circuit 15 comprising the sum of the voltages $e_1$, $e_2$, $e_3$ and $e_4$ is passed to beam current display means 7 and, additionally or alternatively, to an integrator 8 and dose display means 9. As will be apparent, as all four voltages are summed, any increase in one due to deviation of the beam will be compensated by a decrease in another and the summed signal thus represents the beam current regardless of any deviation of the beam.

Desirably, and as shown, the apparatus of FIG. 2 includes means responsive to the indication of any deviation of the beam by the position difference signals $(e_1 - e_2)$ and $(e_3 - e_4)$ to alter the path of the beam to return it to the desired path. In FIG. 2, such means are shown as an electrostatic deflection arrangement 21 comprising two orthogonal pairs of electrodes, each connected to the output of the appropriate one of the amplifiers 18 and 19. As will be apparent to those skilled in the art, the beam correction means could be embodied in other forms. Referring to the above-mentioned paper in the Proceedings of the IEE, there is there described an arrangement for stabilizing a 4 MeV proton beam by using a modulated return electron beam of a mean value of a few microamps which gives a response time of the complete loop of better than one-tenth microseconds. It is contemplated that a similar arrangement may be used in the apparatus of FIG. 2 to provide a fast acting control loop to correct any deviation of the beam.

If means for correcting any deviation of the beam is provided, any deviation of the beam should be small and quickly suppressed. In this case, as the individual voltages $e_1$ to $e_4$ will only vary by very small amounts and for small periods, it is possible that the addition circuit 15 can be dispensed with, the beam current being measured by connecting any one of the voltages $e_1$ to $e_4$ directly to the display means 7 and/or the integrator 8, as in the apparatus of FIG. 1.

Figure 3:
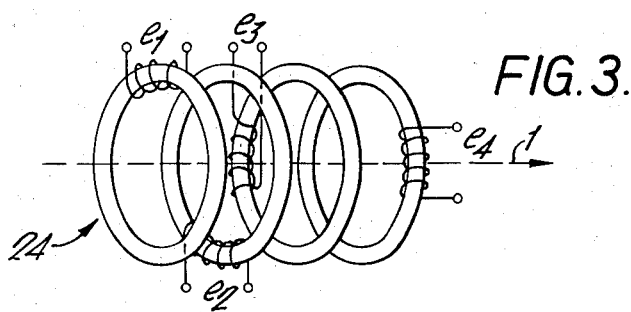
FIG. 3 shows a coil assembly comprising four toroidal coils which can be used in place of the multi-section toroid shown in FIG. 2.

FIG. 3 shows a coil assembly 24 which can be employed in the apparatus of FIG. 2 in place of the multi-section toroidal coil 14. In the coil assembly of FIG. 3, windings corresponding to those shown in FIG. 2 are provided on respective, individual toroidal coils spaced apart along and coaxial with the beam axis, rather than on sections of a single toroid. Using individual toroids stops $\mu_r$ from being reduced, as it is in the FIG. 2 arrangement due to the gaps between the sections. Apparatus embodying the coil assembly 24 would function in substantially the same manner as the apparatus of FIG. 2. However, in this case, the sum and difference signals $(e_1 + e_2 + e_3 + e_4)$, $(e_1 - e_2)$, $(e_3 - e_4)$ represent the average values of current and deviation along the length of the beam passing through the toroids.

Although the invention has been particularly described with reference to the control of focussed ion beams, it should be appreciated that it is more generally applicable to the control of beams of other charge particles, e.g. electron beams.

It should be appreciated that, although sinusoidal modulation of the beam has been described above, other forms of amplitude modulation, e.g. pulse or square wave modulation, can be employed.

I claim:

1. Apparatus for monitoring the current comprised by a beam of charged particles, comprising means for modulating the amplitude of said beam to thereby correspondingly modulate the strength of the magnetic field of said beam, detector means responsive to the magnetic field of said beam to provide at least three output signals each corresponding to the modulation of the strength of the magnetic field of said beam at a respective one of a plurality of positions equally spaced around a desired path of movement of said beam, and means for comparing and developing from said at least three output signals a pair of position signals each indicating the position of said beam along a respective one of a pair of orthogonal axes perpendicular to and passing through said desired path of movement of said beam.

2. Apparatus according to claim 1, wherein said modulating means is adapted to sinusoidally modulate the amplitude of said beam.

3. Apparatus according to claim 2, wherein said modulating means is adapted to substantially 100% amplitude modulate said beam.

4. Apparatus according to claim 1, including means for displaying said position signals.

5. Apparatus according to claim 1, including means for altering the path of movement of said beam, said means being connected to receive said position signals to correct any deviation of said beam from said desired path.

6. Apparatus according to claim 1, including means for summing said output signals to provide a further signal which is proportional to the beam current regardless of any deviation of said beam from said desired path.

7. Apparatus according to claim 6, including an integrator connected to receive said further signal from said summing means to integrate the further signal with time.

8. Apparatus according to claim 1, wherein said detector means is adapted to provide four said output signals and said means for comparing comprises first and second subtraction circuits each adapted to subtract output signals from a respective pair of the output signals proportional to the modulation of the magnetic field at opposed positions, each subtraction circuit providing one of said position signals.

9. Apparatus according to claim 1, wherein said detector means comprises a plurality of separate coils, one for providing each said output signal, said coils cooperating to form a multi-section toroid coaxial with said desired path of said beam.

10. Apparatus according to claim 1, wherein said detector means comprises a plurality of separate toroidal coils, one for providing each said output signal, spaced apart along and each coaxial with said desired path of said beam.

11. Apparatus according to claim 1, including a source adapted to supply a focussed ion beam.

12. A method of monitoring the current comprised by a beam of charged particles, comprising modulating the amplitude of said beam to thereby correspondingly modulate the strength of the magnetic field of said beam, detecting the modulation of the strength of said magnetic field to provide at least three output signals each corresponding to the modulation of the strength of said magnetic field of the beam at a respective one of a plurality of positions equally spaced around a desired path of said beam, and comparing and developing from said at least three output signals a pair of position signals each indicating the position of said beam along a respective one of a pair of orthogonal axes perpendicular to and passing through said desired path of movement of said beam.

13. A method according to claim 12, wherein the amplitude of the beam is modulated sinusoidally.

14. A method according to claim 13, wherein the beam is substantially 100% modulated.

15. A method according to claim 12, including summing said output signals to provide a further signal which is proportional to said beam current regardless of any deviation of the beam from said desired path.

16. A method according to claim 15, including integrating said further signal with time.

17. A method according to claim 12, including displaying said position signals.

18. A method according to claim 12, including altering the path of movement of said beam to correct any deviation from said desired path indicated by said position signals.

19. A method according to claim 12, wherein four said output signals are detected and said comparing step comprises subtracting from each of two of the output signals the output signal derived from the opposed position to provide two difference signals comprising said position signals.

20. A method according to claim 12, wherein said beam is a focussed ion beam.

* * * * *